United States Patent

Benoist

[15] 3,657,840

[45] Apr. 25, 1972

[54] DISPLAY UNIT FOR PLANTS, PARTICULARLY FLOWERS

[72] Inventor: Yves Benoist, Ferme de Fresnay, Garancieres, France

[22] Filed: Dec. 22, 1969

[21] Appl. No.: 887,293

[30] Foreign Application Priority Data

Dec. 24, 1968 France..................................180484

[52] U.S. Cl..............................47/41, 206/46 PL, 150/52 R
[51] Int. Cl...........................................................A01g 5/00
[58] Field of Search...............47/34.11, 41; 206/56 A, 59 R, 206/46 PL; 150/52 R

[56] References Cited

UNITED STATES PATENTS

| | | | |
|---|---|---|---|
| 1,873,666 | 8/1932 | Roy | 47/34.11 X |
| 2,774,187 | 12/1956 | Smithers | 47/41 |
| 1,044,260 | 11/1912 | Schloss | 47/41 |
| 2,033,627 | 3/1936 | Gardner | 47/34.11 |
| 2,908,308 | 10/1959 | Dearholt | 150/52 R |

*Primary Examiner*—Robert E. Bagwill
*Attorney*—Spensley, Horn and Lubity

[57] ABSTRACT

The invention concerns a display unit for flowers which also conserves and protects them during transportation.

4 Claims, 3 Drawing Figures

DISPLAY UNIT FOR PLANTS, PARTICULARLY FLOWERS

Horticulturists have always been faced with very difficult problems as regards the packaging and transportation of cut flowers.

Indeed, taking roses as an example, these are cut, bunched and dispatched to wholesalers before being purchased and distributed by retail florists.

Rose-growing calls for special attention, as the best growing conditions are only found in an atmosphere whose hygrometric degree is controlled.

As a consequence, there are numerous drawbacks which mean that the flowers distributed never bloom as they should do, due to the fact that they are subjected to frequent and sudden changes of atmospheric conditions (heat and humidity), and to bad transportation conditions.

In this patent, roses are taken as the example, but the problems posed by the packaging of roses are found under different aspects for all other plants or flowers.

The aim of this invention, therefore, is to remedy these drawbacks and to this end concerns a display unit for plants, particularly flowers, characterized by the fact that it is made up of a continuous strip which unrolls, the width of the said strip being approximately equal to the length of the stem of the plant or flower, the plant or flower being fixed by the base of their stems onto the said strip, in order to immobilize them so as to isolate the plants or flowers from each other and to facilitate their transportation, conservation, and presentation for sale.

In accordance with another characteristic of the invention, the plants or flowers are fixed on the continuous strip by any effective method, such as clip, rivet, slit or similar process.

In accordance with one characteristic of the invention, at least one of the longitudinal edges of the continuous strip is marked in millimeters, permitting an equal distance to be left between the flowers, sufficient to allow each said flower plenty of air.

The invention is illustrated as an example in the attached drawings in which.

Figure 1:
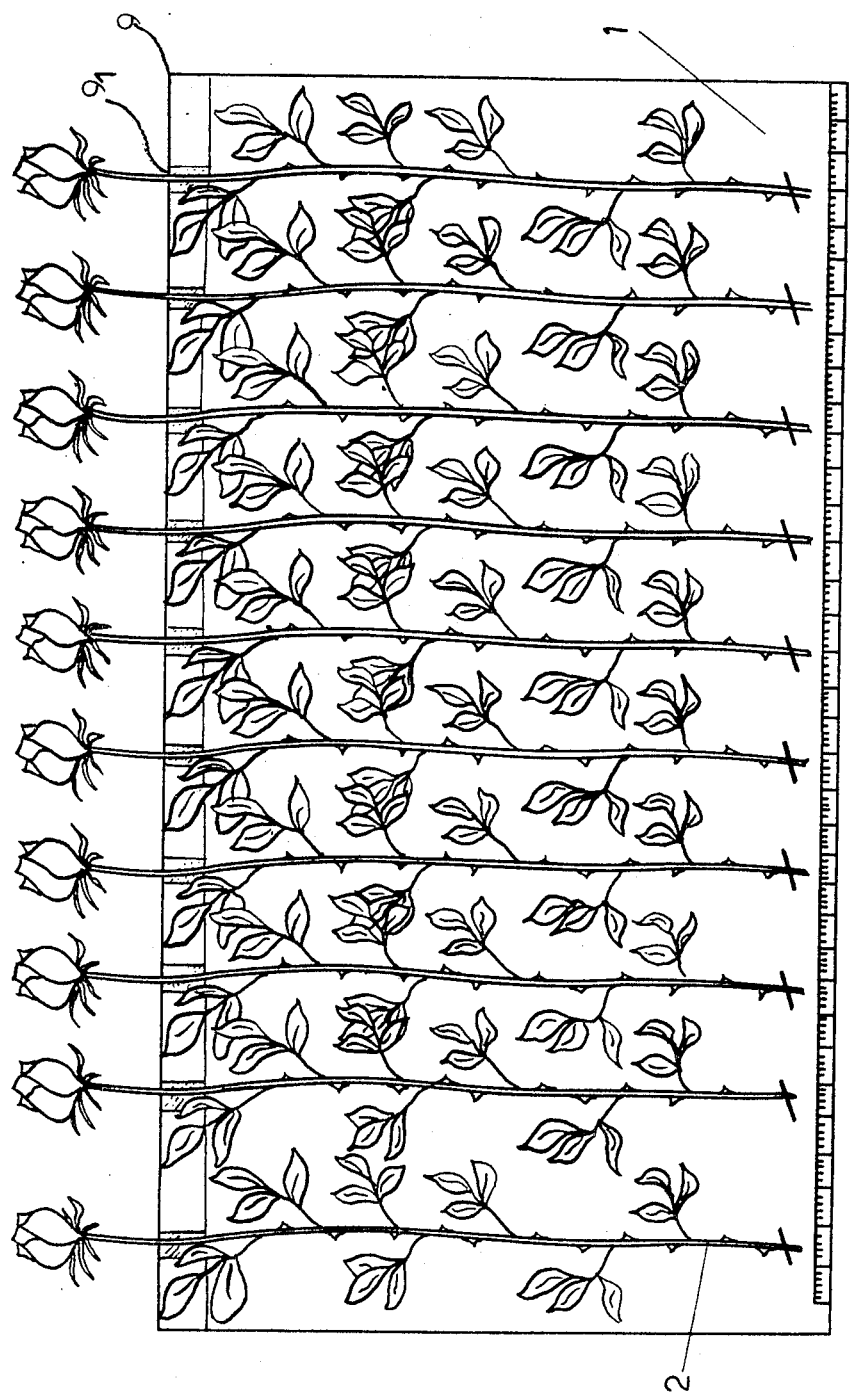
FIG. 1 is a view of a cardboard strip onto which flowers, and more particularly roses, are fixed.

As shown in FIG. 1, this invention consists of fixing the base of the flower stems 2 onto a strip of porous material, such as a strip of cardboard, which can absorb and provide the surrounding humidity.

At least one of the longitudinal sides of the continuous cardboard strip is marked in millimeters in such a way that flowers of a given type can be spaced out sufficiently to give each one maximum ventilation so that each flower can be transported without damage.

Depending on the type of flowers, they can be fixed every 2 cm. or every 5 cm., etc.

Figure 2:
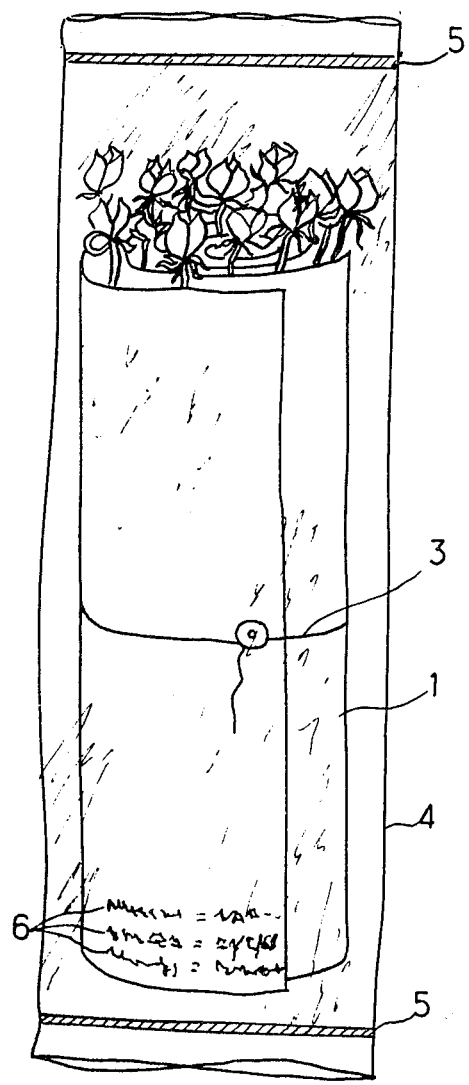
FIG. 2 shows a bunch of flowers packed for transportation.

When a certain number of flowers has been placed on the cardboard strip, a means is used to sever them so as to form a bunch as shown in FIG. 2.

The sheet of cardboard 1, grouping about 20 flowers, is rolled up on itself and kept rolled up by, for example, string 3.

The flowers are therefore isolated from each other, with their heads still free. In order to keep in position the upper parts of the stems, and more particularly near to the heads, a separate strip is fixed along the length of the supporting strip. This strip 9 is crenelated, the upper parts of the stems being housed in the hollow parts $9_1$ of the crenels. The bunch so formed is inserted into a transparent plastic bag 4, welded at each opening 5, in such a way that the humid atmosphere is retained within this adapted watertight enclosure.

The cardboard forming the flower support will become saturated with the humidity necessary to conserve the plant, whilst protecting the stems from deterioration. Before the transparent bag 4 is welded, it would be possible to admit a certain amount of pre-conditioned air (humidity, pressure, temperature, perfume, etc.) in order to perfect still more the optimum conservation conditions within the said bag.

It is possible to make markings 6 on the cardboard sheet which the user considers useful (date when the flower was cut, strain, latest date for conservation, publicity, etc.).

Figure 3:
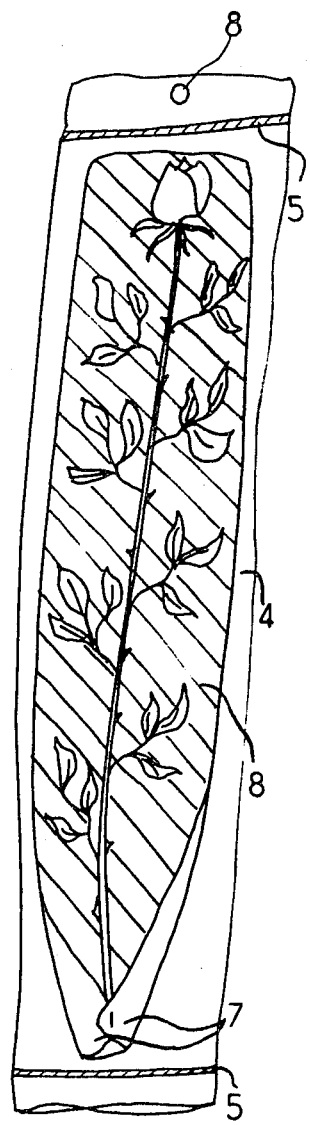
FIG. 3 shows a method for the individual treatment of each flower or plant.

Another method of producing the display unit is illustrated in FIG. 3. The consignee, after having separated each flower (or group of flowers) by cutting the cardboard strip transversally, can clip together the two corners 7 of the base of the display unit and place the ensemble in a transparent plastic bag 4, also welded at each end 5.

These display units can be hung up by using a perforation 8 made outside the two welds isolating the interior of the transparent wrapping, so that they can be hung up and thus presented vertically.

The sheet of cardboard can be decorated with motifs 8 which harmonize with the kind of flower to be sold.

Each flower can be fixed onto the cardboard sheet by means of either a clip, a slit in the cardboard, a stitch, or any other similar method; the user will only have to cut the base of the flower stem diagonally in order to separate it from its support before placing it in a vase.

This arrangement presents numerous advantages, particularly as regards conserving the plant in good conditions, with the packaging bag being able to serve, if need be, as a display unit. In the same way, the handling of flowers with thorns, such as roses, is considerably reduced, hence the risk of pricks is almost completely removed. The flowers can be fixed onto their supporting strips either by hand or by machine. Finally, the placing of the cardboard strip supporting the flowers within the watertight wrapper prevents the formation of condensation on the internal walls of the plastic bag, as this condensation is absorbed by the cardboard.

Transportation presents much less dangerous conditions for the cut flowers, given the fact that their stems are protected by the cardboard strip which will become impregnated with water from the vase in which the bunch is placed and will afterwards diffuse the humidity necessary for the stem and leaves. Finally, commercialization will be improved, particularly for sales of individual flowers, or a small quantity of flowers, neatly presented.

What is claimed is:

1. A display unit for plants having stem and bloom portions comprising:
    a. a continuous, flexible moisture absorbing supporting strip, the transverse dimension of said strip being adapted to receive the stem portion of the plant, said strip having an inner and outer surface;
    b. a divider member having means for maintaining registration of the stems of the plants spaced equidistant from each other along said divider member, said divider member longitudinally secured to said strip along a transverse edge thereof whereby the bloom of the plants are separated from each other upon rolling said strip and mounted plants upon itself;
    c. means for securing a portion of the stems to the inner surface of said strip, said means being coupled to said strip in alignment with said means for maintaining registration of the stems; and
    d. a protective, transparent cover disposed about said rolled strip, the transverse ends of said cover being closed to maintain a watertight seal.

2. A display unit as defined in claim 1 wherein the longitudinal edge of said continuous strip opposite said divider member has distance indicia disposed thereon whereby aid in permitting an equal distance to be left between the plants is provided.

3. A display unit as defined in claim 2 wherein said means for maintaining registration of the stems of the plants comprises crenels disposed in said divider member in equidistant, spaced relation with each other along said divider member.

4. A display unit as defined in claim 3 having a perforation in said transparent cover disposed transversely beyond said watertight seal whereby said display unit with plants therein is enabled to be hung by said perforation.

* * * * *